Patented Nov. 23, 1926.

1,607,982

UNITED STATES PATENT OFFICE.

LEONARD J. HARRIS, OF GLENDALE, CALIFORNIA, ASSIGNOR OF ONE-FOURTH TO WILLIAM OLIN WITTMEYER AND ONE-FOURTH TO JAMES HENRY WITTMEYER, BOTH OF GLENDALE, CALIFORNIA.

FINISH AND METHOD OF APPLYING SAME.

No Drawing. Application filed November 24, 1922. Serial No. 603,101.

This invention concerns the production of an artistic finish upon articles or surfaces, which finish may be employed for various interior and exterior decorative effects and is particularly desirable as a finish for electric fixtures and similar articles.

It is an object of the invention to provide structures or articles having a unique finish which imparts to a surface an antique appearance due to the impression of age which it gives, and it is a further object to provide a finish of this character with which novel color effects may be satisfactorily employed.

I have found that where certain lacquers having a lac base and paints, which are employed for the protection and finish of surfaces, are subjected to the action of a caustic or acid solution, a very unusual effect is attained which is particularly desirable for decorative effects as its novel appearance gives the impression of age to any surface to which the finish may be applied. I have also found it desirable to employ with this finish sand, or other granulated substance, which is embedded in the coat of paint or lacquer, a preferable manner of employing the sand being to sprinkle it upon the paint or lacquer base while the surface of the base is in a viscid condition. Color effects may be employed with this finish either by combining the color pigments in the base coats or by applying it to the sanded surface either before or after the application of the corrosive solution. A preferable manner of applying the finish and one which gives the most satisfactory results is as follows:

The article to be finished is first given a priming coat of lacquer. This lacquer may be applied in any of the customary manners, such as, dipping, spraying, or brush application. After this coat is allowed to dry, a second coat consisting of lacquer enamel which is colored to give the desired base for the color effects which are subsequently applied, and which has a small quantity of denatured alcohol mixed therewith, is applied over the priming coat, thus completing the base upon which the sand may be applied. The use of denatured alcohol causes the second coat of lacquer to combine with the priming coat, thus forming a glutinous surface upon which the sand is sprinkled or thrown by hand while the base is yet in a viscid condition.

An uneven application of the sand is desirable for the most unique effects, as thereby an unevenness of appearance is attained which contributes to the artistic effect. After the base to which sand has been applied is thoroughly dried a corrosive solution consisting of five gallons of water, one ounce of nitric acid, and a quarter of a pound of common salt, is sprayed upon the surface. The action of this corrosive solution is to corrode the sanded surface of the base causing the sand and the base to unite and form a rough surface. The action of corrosion appears to cause the base to flow over the sand which has been applied thereto, as after the corrosive action has taken place, the sand is of the same color as the base, and the particles of sand appear to be homogenous with the base instead of having merely the appearance of particles stuck upon the surface thereof, as is the appearance before the application of the corrosive solution. After the corrosive solution has thoroughly dried, color tints may be applied by a spray method or stencil designs to give various artistic color effects to the antique finish.

Although I have represented the foregoing method of applying this finish as the preferred and most satisfactory form, it is to be understood that the sequence of operations may be considerably varied without departing from the essentials of the invention. In other words, it is to be understood that the desired color effects may be attained by incorporating the color effects in the base or applying them thereto before the application of the sand. It may also be possible to apply the color effects upon the sanded surface before the application of the corrosive solution, and still obtain satisfactory results.

I claim as my invention:

1. The method of applying a finish of the class described which includes: applying a coating of lacquer to the article to be finished; applying sand to said coating while said coating is in a viscid condition; and corroding the surface presented by said coating to said sand.

2. A method as defined in claim 1 in which the lacquer is tinted to give a desired color effect.

3. A method as defined in claim 1 in which color tints are applied over said base and said sand.

4. The method of applying a finish of the class described which includes: applying a coating of lacquer to the article to be finished; applying sand to said coating while said coating is in a viscid condition; corroding the surface presented by said coating to said sand; and applying color tints after said lacquer and said sand have been corroded.

5. The method of applying a finish of the class described, comprising: applying coats of lacquer to give a base of the desired thickness; applying sand to said base while said base is in viscid condition; applying a corrosive solution to corrode the surface of said base and said sand; and applying color tints upon said corroded surface.

6. A method, as defined in claim 5 in which said base is allowed to dry before the application of said corrosive solution.

In testimony whereof, I have hereunto set my hand at Los Angeles, California, this 16th day of November, 1922.

LEONARD J. HARRIS.